United States Patent [19]

Balachandran et al.

[11] Patent Number: 5,573,737
[45] Date of Patent: Nov. 12, 1996

[54] FUNCTIONALLY GRADIENT MATERIAL FOR MEMBRANE REACTORS TO CONVERT METHANE GAS INTO VALUE-ADDED PRODUCTS

[75] Inventors: Uthamalingam Balachandran, Hinsdale; Joseph T. Dusek, Lombard; Mark S. Kleefisch, Napersville; Thadeus P. Kobylinski, Lisle, all of Ill.

[73] Assignee: The United States of America as represented by the United States Department of Energy, Washington, D.C.

[21] Appl. No.: 313,622

[22] Filed: Sep. 27, 1994

[51] Int. Cl.$^6$ .................. B01J 8/02; B01J 19/00; A47G 19/22; B32B 9/00
[52] U.S. Cl. .................. 422/211; 422/239; 422/240; 422/312; 428/34.4; 428/34.5; 428/35.9; 428/697; 428/699; 428/701; 428/702; 428/346
[58] Field of Search .................. 422/211, 239, 422/240, 241, 312; 428/34.4, 34.5, 34.6, 35.9, 697, 699, 701, 702

[56] References Cited

U.S. PATENT DOCUMENTS

| | | | |
|---|---|---|---|
| 3,975,165 | 8/1976 | Elbert | 428/550 |
| 4,109,031 | 8/1978 | Marscher | 427/191 |
| 4,444,731 | 4/1984 | Konoki et al. | 422/310 |
| 4,588,607 | 5/1986 | Matarese et al. | 427/34 |
| 5,086,034 | 2/1992 | Balachandran et al. | 505/1 |
| 5,160,713 | 11/1992 | Mazanec et al. | 423/210 |
| 5,306,411 | 4/1994 | Mazanec et al. | 204/265 |
| 5,418,060 | 5/1995 | Jones | 428/334 |

OTHER PUBLICATIONS

Development of Ceramic Membranes for Partial Oxygenation of Hydrocarbon Fuels to High–Value Added Products, Balachandran et al., Published in Proc. of Coal Liquefaction and Gas Conversion Contractors' Review Conference, Sep. 27–29, 1993, Pittsburhg, PA.

Primary Examiner—Robert J. Warden
Assistant Examiner—Christopher Y. Kim
Attorney, Agent, or Firm—Mark P. Dvorscak; Robert J. Fisher; William R. Moser

[57] ABSTRACT

A functionally gradient material for a membrane reactor for converting methane gas into value-added-products includes an outer tube of perovskite, which contacts air; an inner tube which contacts methane gas, of zirconium oxide, and a bonding layer between the perovskite and zirconium oxide layers. The bonding layer has one or more layers of a mixture of perovskite and zirconium oxide, with the layers transitioning from an excess of perovskite to an excess of zirconium oxide. The transition layers match thermal expansion coefficients and other physical properties between the two different materials.

6 Claims, 6 Drawing Sheets

1

FUNCTIONALLY GRADIENT MATERIAL FOR MEMBRANE REACTORS TO CONVERT METHANE GAS INTO VALUE-ADDED PRODUCTS

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

As oil companies search further into remote regions and to greater depths in their attempts to maintain adequate oil supplies, they encounter ever-increasing amounts of unusable natural gas, which consists mostly of methane. The upgrading of this natural gas to value added products, such as easily transportable fuels, is driven by the abundance of natural gas discoveries in remote areas and the disparity in prices of petroleum liquids versus gas on a BTU cost basis. Over the past several years, extensive efforts have been focused on both the direct and indirect conversion of methane to value-added products, particularly easily transportable fuels. The direct conversion routes involve some form of partial oxidation of methane to methanol, formaldehyde, or olefins. This is a difficult approach because it is complicated by significant competitive side reactions that result in low selectivities to the desired products. Moreover, the reaction must be carried out at high temperatures in the gas phase. The reaction products are more reactive than the starting material, and the competitive gas-phase reactions lead to deep oxidation. Any technological breakthrough in the direct conversion of methane could have a significant economic impact in the industrial sector.

The indirect routes for the conversion of methane involve oxidation of methane to form syngas ($CO+H_2$) in a first stage either by steam reforming, direct partial oxidation or a combination of both, and then converted into upgraded products such as paraffins, olefins, oxygenates, waxes, and mid-distillate fuels in a second stage by the application of Fischer-Tropsch technology. The indirect route, and in particular the syngas step, is usually very energy- and capital-intensive (steam reforming is highly endothermic), operating at high pressures and temperatures. The cost of syngas production by steam reforming can be at least 60% of the integrated cost of the total plant.

Although direct partial oxidation of methane using air as a source of oxygen is a potential alternative to today's commercial steam-reforming processes, downstream processing requirements cannot tolerate nitrogen (recycling with cryogenic separations is required), and pure oxygen must be used. The most significant cost associated with partial oxidation is that of the oxygen plant. Any new process that could use air as the feed oxidant and thus avoid the problems of recycling and cryogenic separation of nitrogen from the product stream will have a dominant economical impact on the cost of a syngas plant, which will be reflected in savings of capital and separation costs.

Dense ceramic membranes represent a class of materials that offer potential solutions to the above-mentioned problems associated with natural gas conversion. Certain ceramic materials exhibit both electronic and ionic conductivities (of particular interest is oxygen ion conductivity). These materials not only transport oxygen (functioning as selective oxygen separators), but also transport electrons back from the catalytic side of the reactor to the oxygen-reduction interface. As such, no external electrodes are required, and if the driving potential of transport is sufficient, the partial oxidation reactions should be spontaneous. Such a system will operate without the need of an externally applied electrical potential. Although there are recent reports of various ceramic materials that could be used as partial oxidation ceramic membrane, little work appears to have been focused on the problems associated with the stability of the material under methane conversion reaction conditions.

Perovskites in the system La-Sr-Fe-Co-O (LSFC) have been shown to not only exhibit both oxygen ionic and electronic conductivity but also appreciable oxygen permeabilities ($\approx 2$ orders of magnitude higher than that of stabilized zirconia) at temperatures $\approx 800°$ C. These perovskites are thus a natural candidate for methane conversion, where large quantities of oxygen are required.

Ceramic materials in the family $La_{1-x}Sr_xCo_{1-y}Fe_yO_{3-\delta}$ are considered promising materials for oxygen permeation at elevated temperatures. Researchers have investigated the oxygenation permeation of several materials with different values for x and y. The stability of those materials under actual gas conversion conditions however, is somewhat problematic.

A variety of formulations in the system La-Sr-Co-Fe-O have been synthesized, and reactor tubes according to these formulations have been fabricated. These tubes were tested for conversion of methane and it was found that one particular composition, $SrCo_{0.05}FeO_{3-x}$ is more stable than any other composition in this family of materials. Reactors fabricated using this formula yielded good methane conversion results. This formulation is disclosed in U.S. patent application Ser. No. 08/212,251, filed Mar. 18, 1994, and incorporated herein by reference. Even though the material disclosed in U.S. Ser. No. 08/212,251 exhibits greater stability than other related compositions, there are certain problems associated with it. The reactor tubes fracture at regions slightly away from the hot reaction zone (the temperature of the hot reaction zone is >800° C., while the temperature at the failure regions is about 700° C.). This may be due to slow oxygen permeation at lower temperatures through the perovskite material from air side to methane side. The slow oxygen permeation retards the refurbishing of any oxygen lost from the lattice sites in the perovskite and thus causes the material to decompose, and eventually fail by cracking.

Accordingly, it is an object of the present invention to provide a stable reactor tube composition for directly converting methane to value-added-products that is capable of using oxygen as the feed oxidant.

It is another object of the present invention is to provide a stable ceramic reactor tube for converting low hydrocarbons to high value products that exhibits greater stability when exposed to a reducing gas environment for extended time periods.

Yet another object of the present invention to provide a stable reactor tube for converting low hydrocarbons to high value products that has a compositions that exhibits both ionic and electronic conductivity as well as appreciable oxygen permeabilities.

SUMMARY OF THE INVENTION

A hollow tube reactor for partial oxygenation of hydrocarbon fuels to high-value-added products may include an outer tube of a perovskite having the general formula $ABO_3$, where A and B are cations having mixed electronic and ionic conductivity; an inner tube of doped-zirconium oxide; and, a middle tube bonded between the outer tube and the inner tube, the middle tube transitioning from an excess of perovskite at its boundary with the outer tube to an excess of zirconium oxide at its boundary with the inner tube. Oxygen from air which passes over the outer tube is transported through the outer, middle, and inner tubes where it reacts with methane gas passing through the inner tube, generating partial oxidation products. The A and B sites on the perovskite outer tube each contain a mixture of A metal ions and B metal ions. It is preferred that the perovskite exhibits oxygen ionic and electronic conductivity and substantial oxygen permeabilities at temperatures of about 800° C. More specifically, the perovskite would have the general formula $Sr_\alpha(Fe_{1-x}Co_x)_{\alpha+\beta}O_\delta$, where x is a number in a range from 0.01 to 1, $\alpha$ is a number in a range from about 1 to 4, $\beta$ is a number in a range upward from 0 to about 20, and 6? is a number which renders the compound charge neutral.

A reactor for conversion of methane and other low-hydrocarbon gases into high-value-added products may also comprise a functionally gradient hollow tube having an inner layer of a $ZrO_2$ based mixed conductor in contact with highly reducing methane gas; an outer layer of a mixed metal oxide composition that demonstrates oxygen ionic conductivity and electronic conductivity, and in contact with an oxidizing atmosphere; a middle layer of material transitioning from an excess of the $ZrO_2$ based mixed conductor mixed metal oxide at its boundary with the inner tube to an excess of the mixed metal oxide composition at its boundary with the outer tube. The oxygen from the oxidizing atmosphere in contact with the outer tube is transported through the outer, middle, and inner tubes where it reacts with the methane gas in contact with the inner tube, generating partial oxidation products. The outer layer of a mixed metal oxide composition preferably has the general formula $Sr_\alpha(Fe_{1-x}Co_x)_{\alpha+\beta}O_\delta$ where x is a number in a range from 0.01 to 1, $\alpha$ is a number in a range from about 1 to 4, $\beta$ is a number in a range upward from 0 to about 20, and 6 is a number which renders the compound charge neutral.

BRIEF DESCRIPTION OF THE DRAWINGS

The above-mentioned and other features of the invention will become more apparent and be best understood, together with the description, by reference to the accompanying drawings, in which.

DETAILED DESCRIPTION OF THE INVENTION

As stated previously, a variety of formulations in the system La-Sr-Co-Fe-O have been fabricated as reactor tubes. The composition $Sr\,Co_{0.5}FeO_{3-x}$ has been found to be more stable than any other composition in this family of materials. However, reactor tubes of this material fracture at regions slightly away from the hot reaction zone of temperatures >800° C. This may be due to slow oxygen permeation at lower temperatures through the perovskite material from air side to methane side. The slow oxygen permeation retards the refurbishing of any oxygen lost from the lattice sites in the perovskite and thus causes the material to decompose and eventually fail by cracking.

$ZrO_2$-based systems with dopants of oxides of Ti, In, Pr, Eu, exhibit mixed conductivity: both electronic and ionic conductivities. The composition of the samples in this system can be adjusted to tailor the material for specific uses. By adjusting the composition a three dimensional composite of a continuous ionically (oxygen ion) conducting $ZrO_2$ phase and a continuous electronically conducting additive oxide phase can be obtained. $ZrO_2$ is known to be vary stable in both oxidizing and reducing conditions. The stability of all the additive oxides is not well known, but $Eu_2O_3$ and $In_2O_3$ remain in a single phase region for a wide range of oxygen partial pressure conditions. It is expected that the electronic conductivity of the composites to increase as the oxygen pressure is decreased. Considering the favorable properties of oxides of Zr, Eu, and In, a reactor membrane fabricated from the combination of these oxides could be expected to be very stable during conversion of methane into syngas and other products at elevated temperatures. Thus, a functionally gradient composition as reactor material is disclosed herein.

Figure 1:
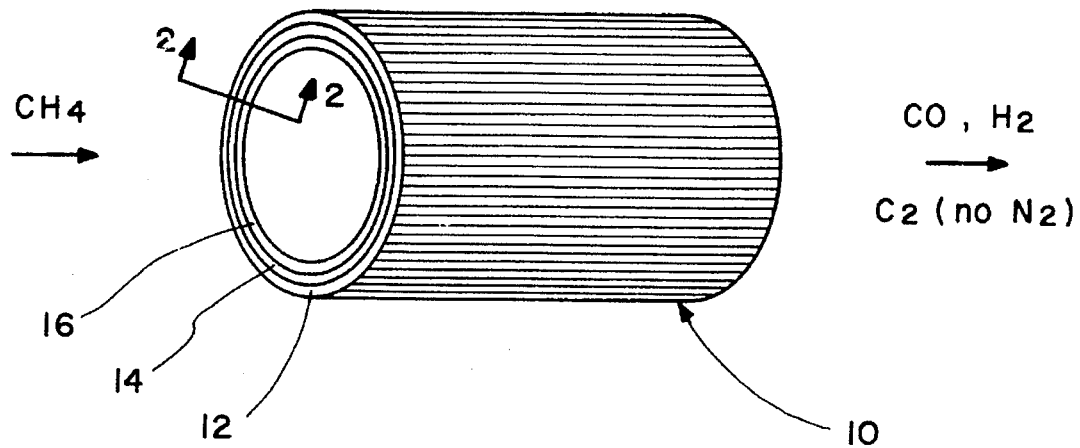
FIG. 1 shows a schematic diagram of a membrane reactor for methane conversion in accordance with the present invention.
Figure 2:
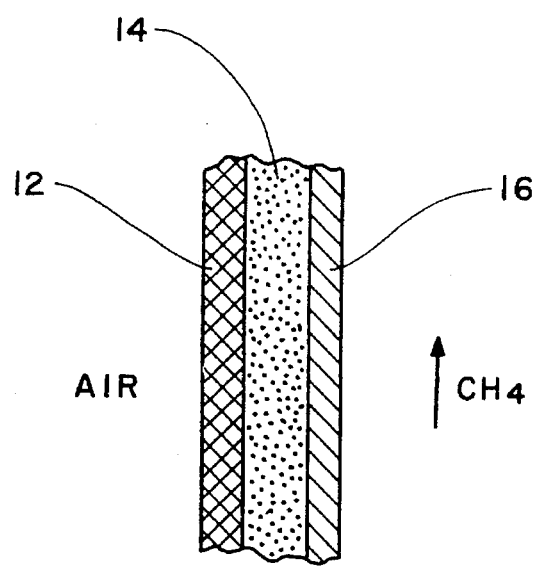
FIG. 2 is a sectional view of the membrane reactor of FIG. 1 showing a detailed view of the layers of the membrane.

Referring to FIGS. 1 and 2, a hollow tube 10 for use as reactor material for the conversion of methane ($CH_4$) into value-added-products is represented. The membrane 10 is a functionally gradient composition having an outer tube 12 of a perovskite which is in contact with air, an inner tube 16 of zirconium oxide, $ZrO_2$, which is in contact with the methane gas, and a bonding or transition layer 14 between the outer tube 12 and the inner tube 16.

More particularly, the inner tube 16 is a thin, dense layer (about 1–2 mils) of a $ZrO_2$-based mixed conductor that is in contact with highly reducing methane gas. The perovskite-type oxide ($ABO_3$) outer layer 12 is in contact with a more favorable oxidizing atmosphere, preferably air of at least $O_2$ and $N_2$. This $ZrO_2$ based system may not have sufficient electronic conductivity. However, the very thin inner-tube layer 16 can be tolerated in the reactor tube 10 because the electron path lengths are very short and the resistance for the electron transfer will not be very high. The ionic conductivity will not cause a problem with the passage of the oxygen ion through the material. The bond layer 14 is a mixture of the $ZrO_2$ based oxide plus the perovskite oxide, with the layers transitioning from an excess of perovskite to an excess of zirconium oxide. These transition layers are necessary to match thermal expansion coefficients and other physical properties between the two different materials.

The outer perovskite layer 12 is a mixed metal oxide composition that demonstrates oxygen ionic conductivity and electronic conductivity. Specifically, the outer layer 12 has the general formula

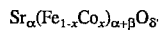

$$Sr_\alpha(Fe_{1-x}Co_x)_{\alpha+\beta}O_\delta.$$

where x is a number in a range from 0.01 to 1, $\alpha$ is a number in a range from about 1 to 4, $\beta$ is a number in a range upward from 0 to about 20, and δ is a number which renders the compound charge neutral.

Oxygen is transported across the ceramic material or membrane 12 in the form of oxygen anion and not oxygen molecule. The purity of separated oxygen is determined by the selectivity of ceramic material for oxygen ions. Such materials can be shaped into a hollow-tube reactor, with air passed over the shell side of the membrane and methane through the inside, as shown in FIG. 1. The membrane 12 is permeable to oxygen at high temperatures, but not to nitrogen or any other gas. Thus, only oxygen from air can be transported through the membrane to the inside of the reactor surface 16, where it reacts with methane to generate partial oxidation products CO, $H_2$, $C_2$, but not $N_2$. This consequently precludes the need for an oxygen plant and allows the integration of suitable reactors.

EXPERIMENTAL

Ceramic powders of LSFC with varying stoichiometry are made by solid-state reaction of the constituent carbonates and nitrates. Appropriate amounts of $La(NO_3)_3$, $SrCO_3$, $Co(NO_3)_2 \cdot 6H_2O$ and $Fe(NO_3)_3 \cdot 9H_2O$ are mixed and milled in methanol using $ZrO_2$ media for ≈15 h. After drying, the mixtures are calcined in air at ≈850° C. for ≈16 h with an intermittent grinding. After the final calcination, the powder is ground in an agate mortar and pestle. The average particle size is ≈7 mm. The calcined powders are characterized by XRD, SEM, thermal and particle size/distribution analysis. The morphology and particle size distribution play a significant role during the fabrication of membrane tubes.

The membrane tubes are fabricated by plastic extrusion. To prepare for extrusion, ceramic powder is mixed with several organic additives to make a formulation with enough plasticity to be easily formed into various shapes while retaining satisfactory strength in the green state. This formulation, known as a slip, consists in general of a solvent, a dispersant, a binder, a plasticizer, and ceramic powder. The role of each additive is described in *Balachandran et al., Proceedings International Gas Research Conference*, Orlando, Florida (H. A. Thompson editor, Government Institutes, Rockville, Md.), pp. 565–573 (1992). Ratios of the various constituents of a slip vary, depending on the forming process and such characteristics of the ceramic powder as particle size and specific surface area. After the slip is prepared, some of the solvent is allowed to evaporate; this yields a plastic mass that is forced through a die at high pressure (≈20 MPa) to produce hollow tubes. Tubes have been extruded with outside diameter ≈6.5 mm and lengths up to ≈30 cm. The wall thicknesses are in the range 0.25–1.20 mm. In the green state (i.e., before firing), extruded tubes exhibit great flexibility.

Extruded tubes are heated at a slow heating rate (≈5° C./h) in the temperature range 150°–400° C. to facilitate removal of gaseous species formed during decomposition of organic additives. After the organics are removed at low temperatures, the heating rate is increased to ≈60° C./h and the tubes are sintered at ≈1200° C. for 5–10 h. All the heatings are done in stagnant air. FIG. 2 is a photograph of an extruded hollow tube. The sintered LSFC tubes are characterized by SEM and XRD. These tubes are then used in partial oxidation studies to transport oxygen for syngas generation in conjunction with a precious metal reforming catalyst. Experimental results supported the oxygen transport concept with successful utilization toward preferred oxidation. The performance characteristics of the membranes depend on the stoichiometry of the compound. The integrity of tubes fabricated using certain range of stoichiometry of cations in the LSFC family diminished rapidly with time on stream eventually leading to catastrophic failure. Detailed in-situ XRD experiments were done at high temperatures and in different atmospheres on materials with varying stoichiometry to probe the chemical phase behavior. A stable membrane was fabricated that lasted for over 350 h of operation.

Perovskites as a class ($ABO_3$ type oxides) are based on the structure of the mineral perovskite, $CaTiO_3$, which has a cubic lattice with one metal ion in the body-center, the other metal ions at the corners and the anions in the face centers. A variety of substitutions of the A and B cations can occur. Replacing part of a divalent cation by a trivalent cation or a pentavalent ion for a tetravalent ion, i.e., donor dopant, results in two types of charge compensation, namely, electronic and ionic, depending on the partial pressure of oxygen in equilibrium with the oxides. The charge compensation in acceptor-doped oxides, i.e., substituting a divalent cation for a trivalent cation is by electronic holes at high oxygen pressures but at low pressures it is by oxygen ion vacancies. Ion vacancies are the pathway for oxide ions. Therefore, the oxygen flux can be increased by increasing the amount of substitution of lower valence element for a higher valence metal ion. The reported oxygen flux values in perovskites tend to follow the trends suggested by the charge compensation theory. While the primary property of high oxygen flux appears to be feasible in a few combination of dopants in $ABO_3$ type oxides, many other questions need to be answered about the ideal material for constructing a novel membrane reactor. For example, the mechanical properties of the chosen membrane must have the strength to maintain integrity at the conditions of reaction. It must also maintain chemical stability for long periods of time at the reaction conditions. The oxygen flux, chemical stability, and mechanical properties depend on the stoichiometry of the ceramic membrane.

Two membranes have been prepared, and are identified as LSFC-1 and LSFC-2. The LSFC-1 membrane has the formula $SrFe_{0.2}Co_{0.8}O_x$, and the LSFC-2 membrane has the formula $SrFeCoO_x$. The characteristics and the performance in an actual conversion reactor using these membranes were studied, and the results are described in the following text.

Figure 3:
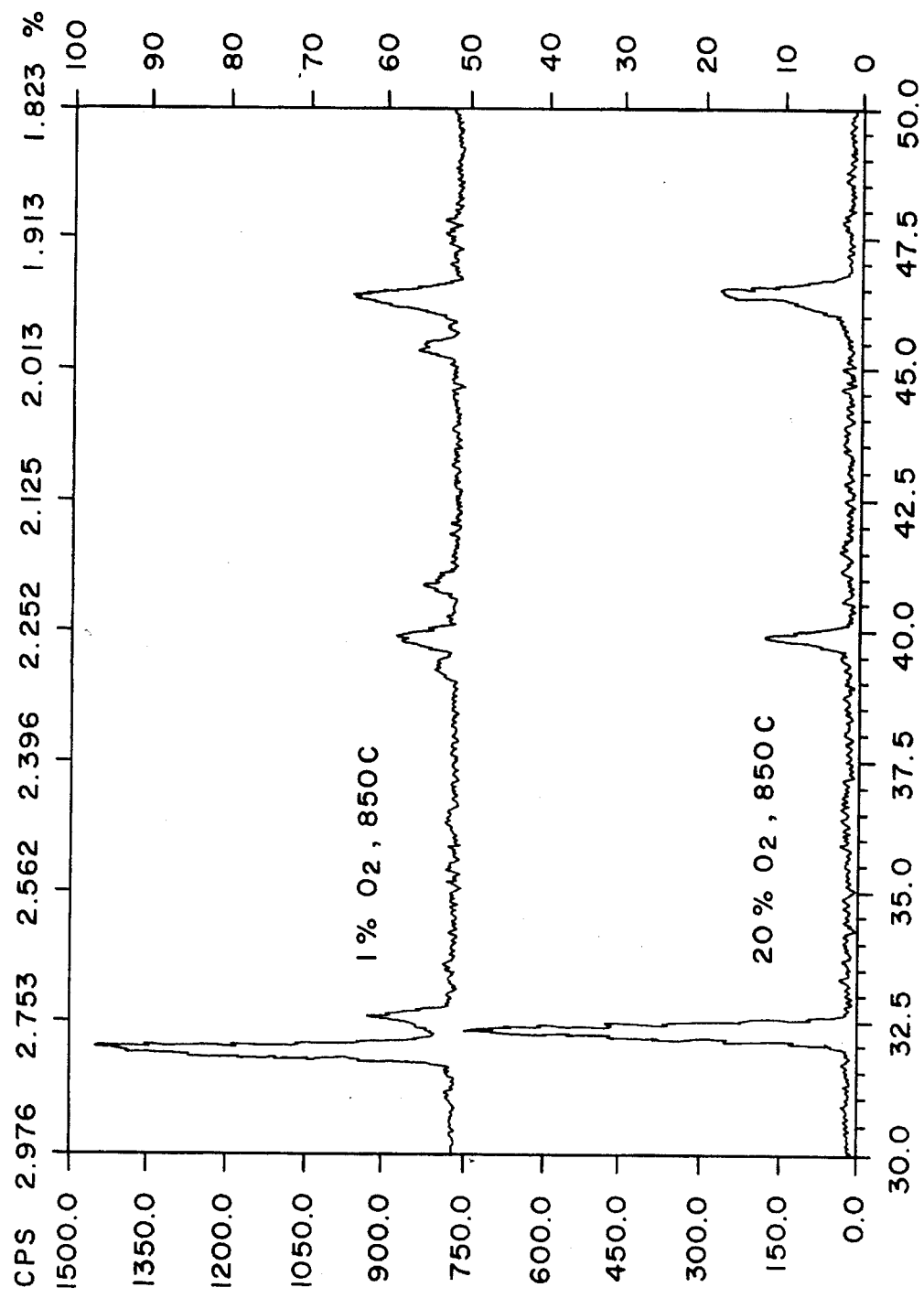
FIG. 3 shows an X-ray diffraction (XRD) characterization of a first LSFC tube, at 850° C. in 1% $O_2$; and 20% $O_2$.

The LSFC-1 tube sintered at ≈1200° C. exhibited grain size ≈10 μm and density ≈5 g/cm3. This tube disintegrated into several pieces within a few minutes in the conversion reactor operated at ≈850° C. In-situ XRD experiments were carried out using a Scintag PAD X vertical goniometer powder diffractometer equipped with a high temperature furnace. XRD patterns were recorded at 850° C. in Ar-$O_2$ gas mixtures. The phase behavior of LSFC-1 at 20% $O_2$ and 1% $O_2$ is shown in FIG. 3. The material is a cubic perovskite in an oxygen-rich (20% $O_2$) atmosphere. Once the oxygen partial pressure is lowered below 5% $O_2$ level, however, the cubic phase transforms to an oxygen-vacancy-ordered phase. New peaks appear in the XRD as seen in FIG. 3 (1% $O_2$). It is important to note that the material expands substantially after the phase transition. This can be seen from the change in the position of the Bragg peak near 32 degrees. Evidently, this peak in the oxygen-vacancy-ordered phase (in 1% $O_2$) is shifted to the low angle (larger d-spacing) side of the corresponding peak in the cubic perovskite phase (in 20% $O_2$). A detailed TGA analysis showed that the oxygen content, x, of the sample in 1% $O_2$ is about 0.1 lower than that in a sample in 20% $O_2$. The dependence of the unit cell volume on the oxygen content of the sample has been established by comparing the lattice parameters. For example, the volume of the primitive perovskite cell, $V_p$, is 57.51 Å$^3$ for x=2.67 and it is 59.70 Å$^3$ for x=2.48. These results show that this material expands as oxygen is removed. Such behavior suggests that an electronic effect is predominant in influencing the specific volume of this material; otherwise a simple size effect would cause the lattice to shrink. By linear interpolation of the above results, we predict that a decrease in x by 0.1 will result in an increase in $V_p$ by ≈2%.

Figure 4:
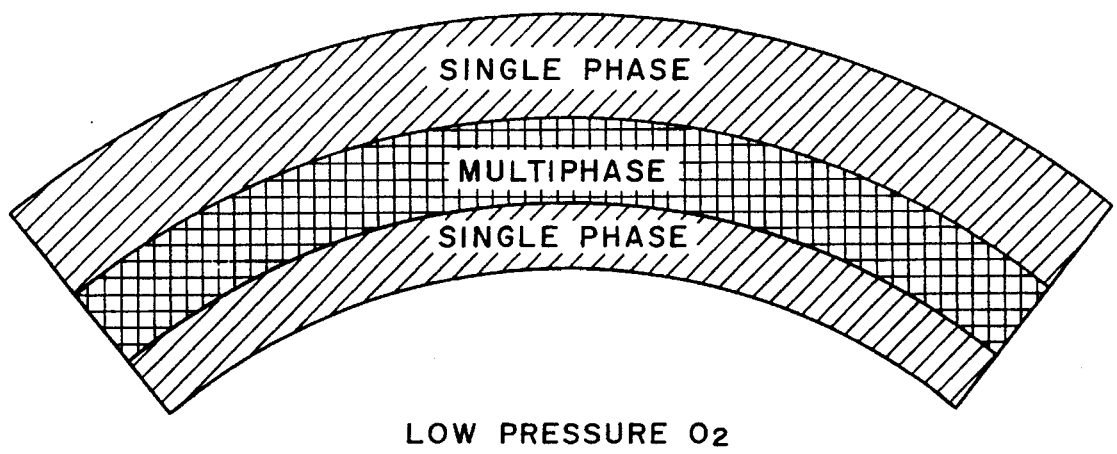
FIG. 4 shows a schematic diagram of a likely phase presentation for a first LSFC tube operating between ambient pressure $O_2$ and low-pressure $O_2$.

Based on the XRD results and the previous TGA data, a clear picture about the state of the LSFC-1 membrane tube under reaction conditions can be obtained. In one situation, the membrane tube acts solely as an oxygen separator. In this case, high oxygen pressure is maintained outside the tube and low oxygen pressure is maintained inside the tube. Before the tube is brought up to high temperature, it has an uniform distribution of oxygen. Upon heating, the tube begins to lose oxygen that was incorporated previously in the fabrication process. Moreover, the material on the inner wall will lose more oxygen than that on the outer wall. As a result, a stable oxygen gradient is generated between the outer and inner walls. It follows that the material, depending on where it is in the tube, may have different phase constituents. The likely phase representation of the tube at 850° C. is shown in FIG. 4. The material is of single phase in the outer and inner zones but of multiphase in the middle zone. In principle, the efficiency of oxygen permeation is different from zone to zone, and the oxygen flux passing through the membrane tube is controlled by the least-permeable zone. It is believed that the inner zone is less oxygen-permeable (due to the more ordered nature of oxygen vacancies) than the outer zone. By contrast, little is known about how phase separation in the middle zone would affect the rate of oxygen permeation in this material.

The most remarkable factor, which can cause tube fracture, appears to be the lattice mismatch between the materials on the two walls of the tube. As mentioned earlier, the oxygen content of the sample in 1% $O_2$ atmosphere is ≈0.1 lower than the oxygen content of sample in equilibrium with 20% $O_2$. Therefore, the material volume on the low-oxygen-pressure side will expand an additional 2% over that on the other wall. Such compositional expansion is equivalent to a thermal expansion of 333° C. (assuming that the volumetric thermal expansion coefficient is ≈6×10$^{-5}$/° C.). Considering the brittleness of oxides in this family of materials, there is no doubt that the tube will break under reaction conditions.

Figure 5:
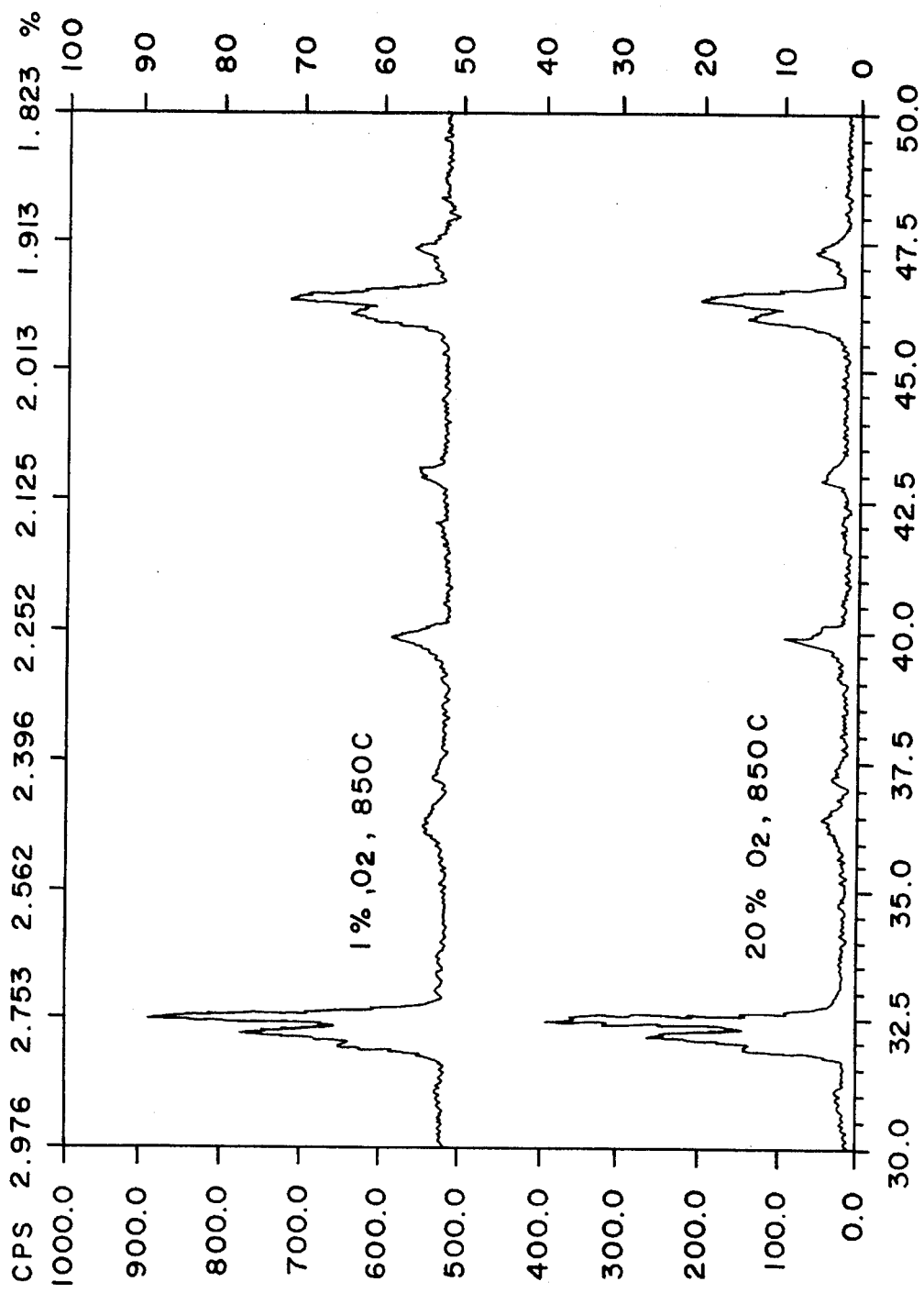
FIG. 5 shows an X-ray diffraction (XRD) characterization of a second LSFC tube, at 850° C. in 1% $O_2$; and 20% $O_2$.

In comparison, sample LSFC-2 exhibits a remarkable structural stability at high temperature, as shown in FIG. 5. No phase transitions were found in this material as oxygen partial pressure is changed. Furthermore, the Bragg peaks stay at the same positions regardless of the oxygen partial pressure of the atmosphere. As a result, no appreciable strain should be built up across the reactor tube. Tubes made of this material, unlike the LSFC-1, should not fracture in the reactor tests.

Figure 6:
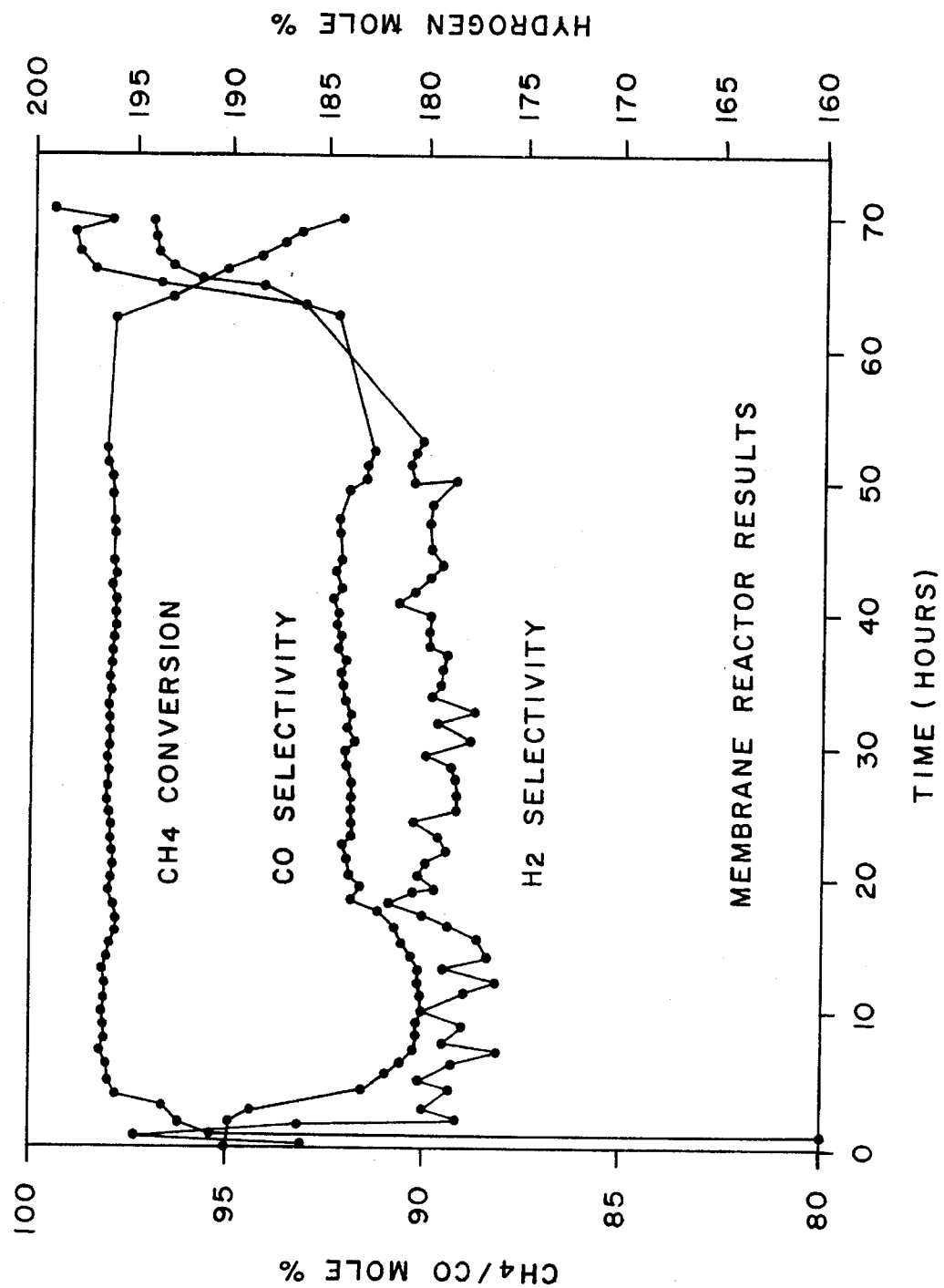
FIG. 6 shows methane conversion and selectivities of CO and $H_2$ in a second membrane reactor with a reforming catalyst; and, FIG. 7 shows methane conversion, $CO_2$ selectivity and oxygen permeability in a second membrane reactor without a reforming catalyst.

FIG. 6 shows the conversion data obtained using a membrane tube made of LSFC-2 material and operated at 850° C. for ≈70 h. A reforming catalyst was used inside the tube. The feed gas contains 80% methane and 20% argon. Argon was used as an internal calibration standard for gas analysis. Both the feed gas and the effluents were analyzed using a gas chromatograph. Air is the source of oxygen. As seen from FIG. 6, better than 98% methane conversion efficiency is obtained. The CO selectivity is over 90%. As expected, the measured $H_2$ selectivity is about twice that of CO (chemical mass-balance shows that for each mole of CO there should be two moles of $H_2$).

Figure 7:
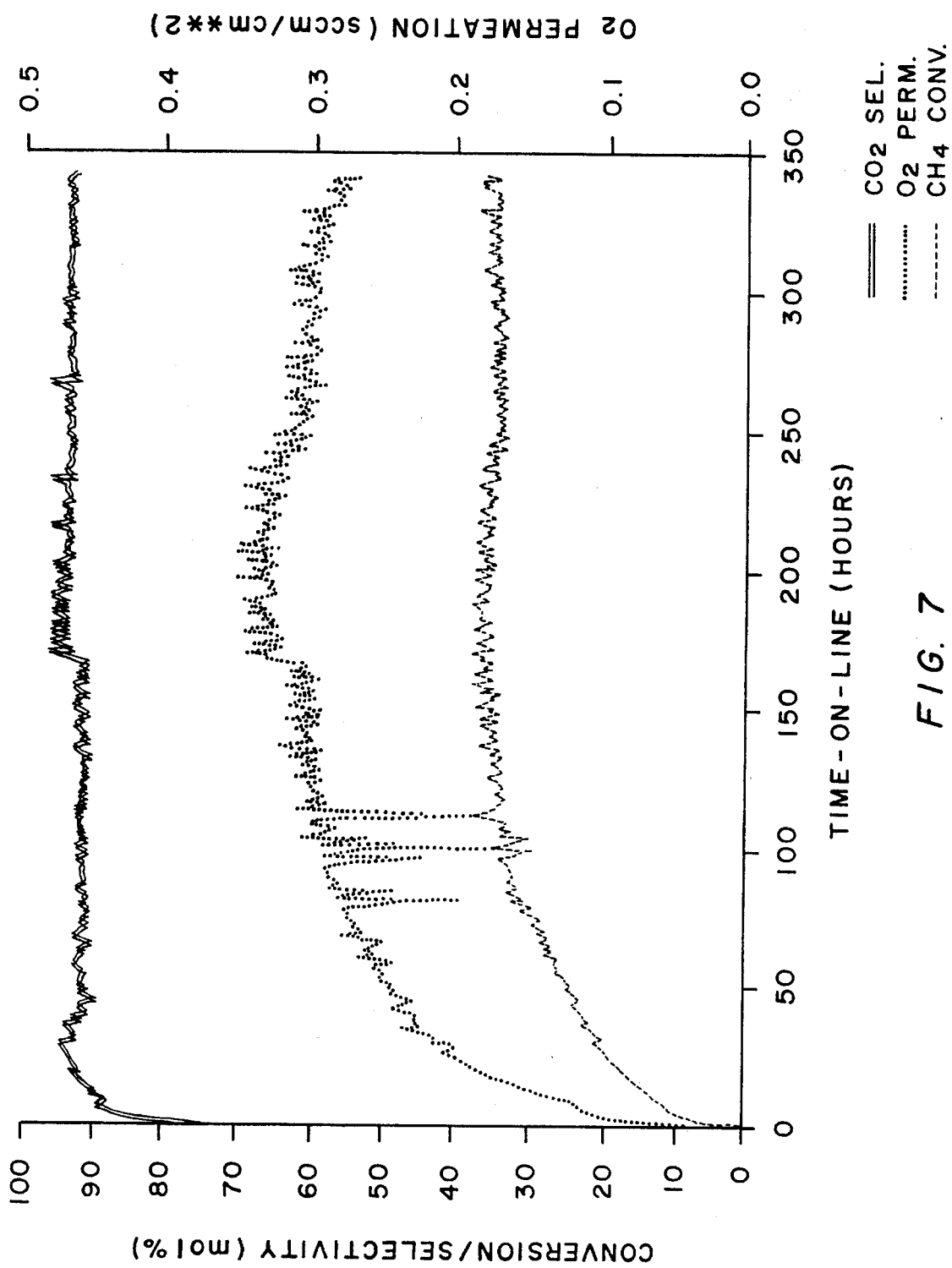

Observations made by Liu et al. indicate that not only the conductivity of the membrane material but also the catalytic activity of the surface, or interfaces has significant impact on the rate of oxygen permeation. The conductivity (ionic and electronic) determines the mass and charge transport rate through the membrane while the catalytic activity controls the rate of the interfacial electrochemical reactions. To decouple the role of catalyst in the transport of oxygen across the membrane, the LSFC-2 tube was tested without the reforming catalyst. The results for ≈350 h run are shown in FIG. 7. The feed gases are the same as before. In the absence of the catalyst, the oxygen transported through the membrane reacts with methane and forms $CO_2$ and $H_2O$. As seen in FIG. 7, ≈35% methane conversion efficiency was obtained and $CO_2$ selectivity was ≈90%. Under the experimental operating conditions, the measured oxygen flux is ≈0.3 scc/cm$^2$/min. As mentioned earlier, the oxygen flux depends on the temperature, oxygen potential difference between the two sides, thickness of the membrane, etc.

Due to the reaction between methane and the oxygen permeating through the membrane, $H_2$ and CO are generated (in the presence of a reforming catalyst). The direct contact between the tube and the $H_2$ gas (CO may have the same effect) may cause the perovskite phase to lose its lattice oxygen. Once much oxygen is lost, the perovskite lattice collapses, and the material decomposes and breaks into pieces. In order to apply the LSFC membrane tube in the conversion of methane to syngas, it is critical to reduce the wall thickness of the tube. Once the wall of the tube is thin (about a few microns), the oxygen lost from the perovskite phase to the reaction stream can be refilled by the oxygen permeable from the high pressure side. As a result, the material in contact with the reaction stream will not be deeply reduced and hence the chemical decomposition would not occur. Meanwhile, the difference in oxygen content between the two walls becomes smaller and consequently, the fracturing of the tube is less likely. Thus, a thin-wall membrane tube appears to be more promising for the application of methane conversion in the future. A thin-wall membrane will also maximize the surface area to volume ratio and thereby reduce the size of the reactor.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property is claimed are defined as follows:

1. A hollow tube reactor for partial oxygenation of hydrocarbon fuels to high-value-added products comprising:

a) an outer tube of a perovskite having the general formula $ABO_3$, where A and B are cations, and B is a transition metal having mixed electronic and ionic conductivity;

b) an inner tube of doped-zirconium oxide; and, c) a middle tube bonded between the outer tube and the inner tube, the middle tube transitioning from an excess of perovskite at its boundary with the outer tube to an excess of zirconium oxide at its boundary with the inner tube;

whereby oxygen in air which passes over the outer tube is transported through the outer, middle, and inner tubes where it reacts with methane gas passing through the inner tube, generating partial oxidation products.

2. The reactor of claim 1 wherein the A and B sites on the perovskite outer tube each contain a mixture of A metal ions and B metal ions.

3. The reactor of claim 2 wherein the perovskite exhibits oxygen ionic and electronic conductivity and substantial oxygen permeabilities at temperatures of about 800° C.

4. The reactor of claim 3 wherein the perovskite has the general formula:

$$Sr_\alpha(Fe_{1-x}Co)_{\alpha+\beta}O_\delta$$

where x is a number in a range from 0.01 to 1, $\alpha$ is a number in a range from about 1 to 4, $\beta$ is a number in a range upward from 0 to about 20, and $\delta$ is a number which renders the compound charge neutral.

5. A reactor for conversion of methane and other low-hydrocarbon gases into high-value-added products comprising:

a functionally gradient hollow tube having an inner layer of a $ZrO_2$ based mixed conductor in contact with highly reducing methane gas; an outer layer of a mixed metal oxide composition that demonstrates oxygen ionic conductivity and electronic conductivity, and in contact with an oxidizing atmosphere; a middle layer of material transitioning from an excess of the $ZrO_2$ based mixed conductor mixed metal oxide at its boundary with the inner tube to an excess of the mixed metal oxide composition at its boundary with the outer tube; whereby the oxygen in the oxidizing atmosphere in contact with the outer tube is transported through the outer, middle, and inner tubes where it reacts with the methane gas in contact with the inner tube, generating partial oxidation products.

6. The reactor of claim 5 wherein the outer layer of a mixed metal oxide composition has the general formula:

$$Sr_\alpha(Fe_{1-x}Co)_{\alpha+\beta}O_\delta$$

where x is a number in a range from 0.01 to 1, $\alpha$ is a number in a range from about 1 to 4, $\beta$ is a number in a range upward from 0 to about 20, and $\delta$ is a number which renders the compound charge neutral.

* * * * *